No. 766,745. PATENTED AUG. 2, 1904.
F. B. TOWNSEND.
ROCKER SIDE BEARING FOR RAILWAY CARS.
APPLICATION FILED NOV. 11, 1903.
NO MODEL. 2 SHEETS—SHEET 1.

WITNESSES:
INVENTOR.
Frederick B. Townsend.
BY Munday, Evarts & Adcock
ATTORNEYS

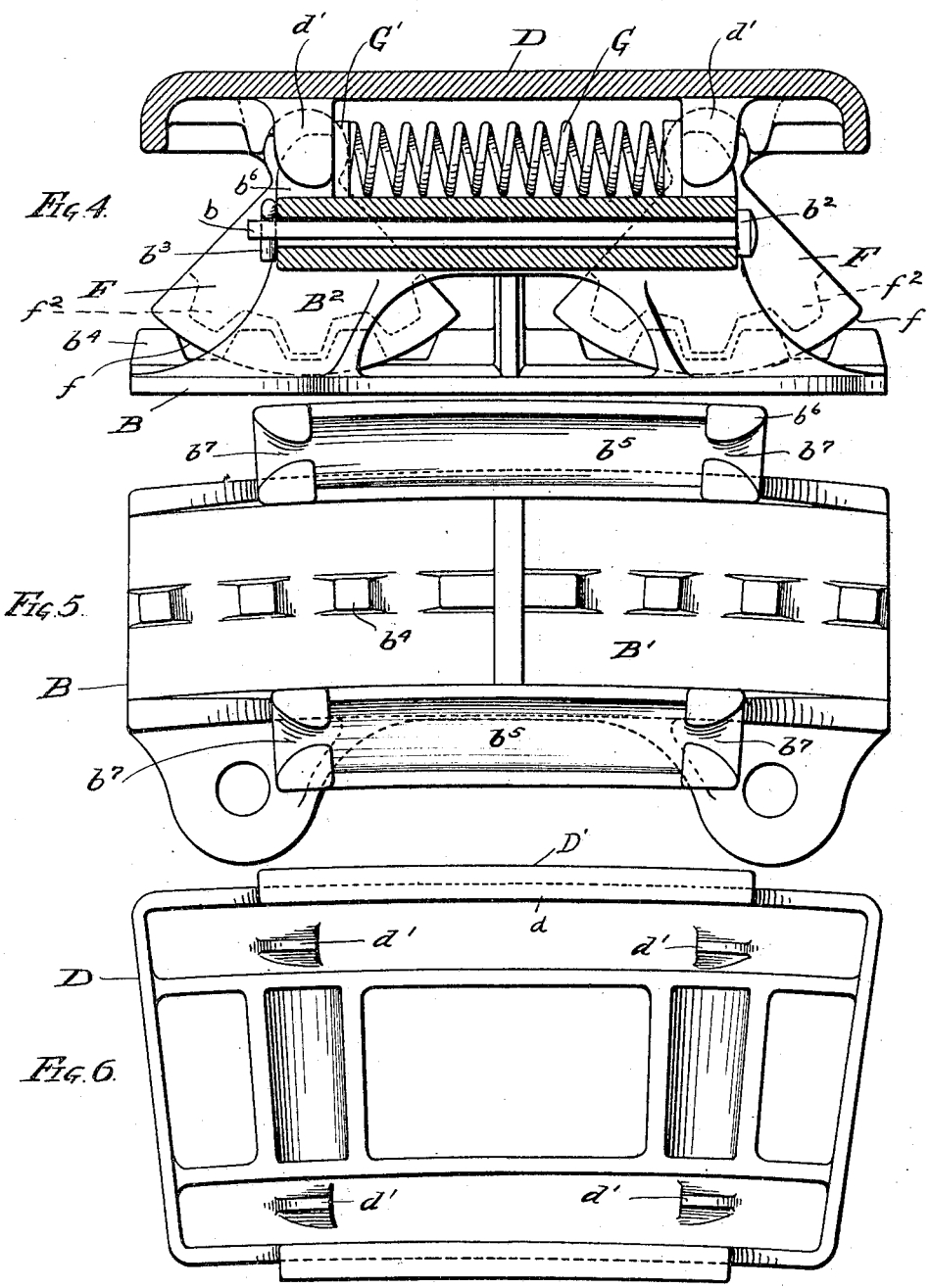

No. 766,745.

Patented August 2, 1904.

UNITED STATES PATENT OFFICE.

FREDERICK B. TOWNSEND, OF CHICAGO, ILLINOIS, ASSIGNOR TO W. H. MINER COMPANY, OF CHICAGO, ILLINOIS, A CORPORATION OF ILLINOIS.

ROCKER SIDE BEARING FOR RAILWAY-CARS.

SPECIFICATION forming part of Letters Patent No. 766,745, dated August 2, 1904.

Application filed November 11, 1903. Serial No. 180,785. (No model.)

*To all whom it may concern:*

Be it known that I, FREDERICK B. TOWNSEND, a citizen of the United States, residing in Chicago, in the county of Cook and State of Illinois, have invented a new and useful Improvement in Rocker Side Bearings for Railway-Cars, of which the following is a specification.

My invention relates to improvements in rocker side bearings for railway-cars, and more particularly to certain improvements upon the rocker side bearing forming the subject of my United States Patent No. 734,010 and having a fixed bottom plate, a reciprocating top plate, and a pair of interposed rockers, and a spring, followers, and stops for causing the top plate and rockers to automatically return to their normal or central position.

My invention consists, in connection with the bottom plate, reciprocating top plate, and interposed rockers, of a pair of springs, one upon each side of the rockers, mounted in channels or guides formed on the bottom plate in connection with stops and followers to cause the reciprocating top plate and rockers to return to their normal or central position when relieved from weight or pressure.

Figure 1:
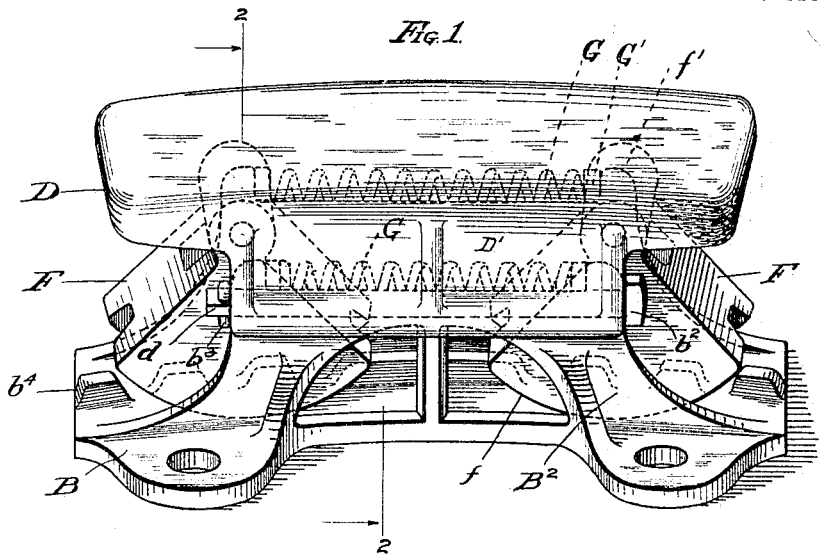
Figure 2:
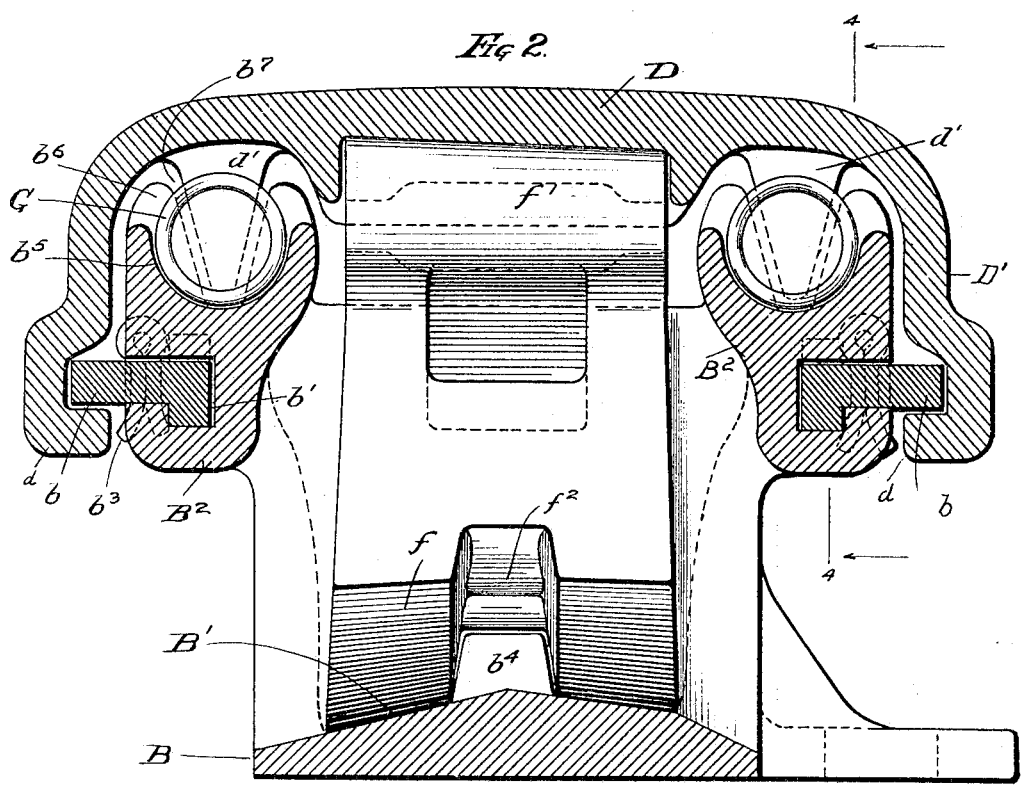
Figure 3:
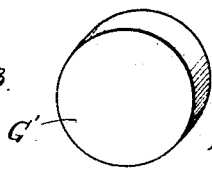

In the accompanying drawings, which form a part of this specification, Figure 1 is a perspective view of a rocker side bearing embodying my invention. Fig. 2 is a cross-section on the broken line 2 2 of Fig. 1. Fig. 3 is a detail perspective view of one of the followers or washers. Fig. 4 is a section on the broken line 4 4 of Fig. 2. Fig. 5 is a detail plan view of the bottom plate, and Fig. 6 is a detail bottom view of the top plate.

In the drawings, B is the bottom or base plate of the side bearing, the same or its tread B' being curved on the arc of a circle whose center is the king-bolt upon which the car turns.

D is the reciprocating top plate, and F F the rockers interposed between the top and bottom plates.

The bottom and top plates B D are furnished with interfitting guides $b$ and $d$, the guides $b$ being removable and mounted in a suitable slot $b'$ in the upright wings $B^2$ of the bottom plate B. The guides $d$ on the reciprocating top plate are integral therewith or with its depending side walls D' D', which overhang and embrace the upright wings $B^2$ on the bottom plate B. The guides $b$ have heads $b^2$ and are removably secured in place by keys $b^3$.

The rockers F F have, preferably, each a large curved lower bearing-face $f$ and a small curved upper bearing-face $f'$, the bearing-faces being concentric with each other and slightly tapering or conical to compensate for the curvature of the top and bottom plates about the king-bolt as a center. The bottom plate B is provided with a central row of teeth $b^4$ to mesh with the notches or teeth $f^2$ on the rockers F. The wings $B^2$ of the bottom plate, one on each side of the rockers, are provided each with a groove or channel $b^5$ to receive the spring G and followers G' and also with stops $b^6$ for the followers or washers G' to abut against, and the top plate D is provided with stops or projections $d'$ to engage the ends of the springs or their interposed followers or washers G'. The stops or projections $d'$ on the reciprocating top plate are adapted to slide through or past the stops $b^6$ on the bottom plate B, the stops $b^6$ having, preferably, openings or slots $b^7$ for this purpose.

I claim—

1. In a rocker side bearing for railway-cars, the combination with a bottom plate, of a reciprocating top plate, a pair of interposed rockers, a pair of springs, one on each side of the rockers, stops or projections on said top and bottom plates for causing in connection with the springs the top plate and rockers to return to their normal or central position, said bottom plate having upright wings furnished with channels or grooves to receive and support the springs, and said reciprocating top plate extending over and covering said springs, and having depending side walls overhanging and embracing the side wings on the bottom plate, substantially as specified.

2. In a rocker side bearing for railway-cars, the combination with a bottom plate, of a reciprocating top plate, a pair of interposed rockers, a pair of springs, one on each side of the rockers, stops or projections on said top and bottom plates for causing in connection with the springs the top plate and rockers to return to their normal or central position, and followers or washers at the ends of the springs, said bottom plate having upright wings furnished with channels or grooves to receive and support the springs, and said reciprocating top plate extending over and covering said springs, and having depending side walls overhanging and embracing the side wings on the bottom plate, substantially as specified.

3. In a side bearing, the combination with a bottom plate provided with side wings having grooves or channels to receive a pair of springs, and stops for the springs to abut against, of a pair of rockers, springs resting in the grooves or channels of said side wings, and a top plate extending over and covering the springs and having stops to engage the springs and depending side walls overhanging and embracing the side walls of the bottom plate, substantially as specified.

4. In a side bearing, the combination with a bottom plate provided with side wings having grooves or channels to receive a pair of springs, and stops for the springs to abut against, of a pair of rockers, springs resting in the grooves or channels of said side wings, a top plate extending over and covering the springs and having stops to engage the springs, depending side walls overhanging and embracing the side walls of the bottom plate, and followers or washers at the ends of the springs, substantially as specified.

5. In a side bearing, the combination with a bottom plate having side wings furnished each with a channel to receive a spring, and having a slotted stop at each end of said channel, of a pair of rockers, a pair of springs resting in the channels of said side wings of the bottom plate, and a top plate fitting over and covering the springs, and having stops or projections to operate the springs, and depending side walls overhanging and embracing the side wings of the bottom plate, substantially as specified.

6. In a side bearing, the combination with a bottom plate having side wings furnished each with a channel to receive a spring, and having a slotted stop at each end of said channel, of a pair of rockers, a pair of springs resting in the channels of said side wings of the bottom plate, and a top plate fitting over and covering the springs, and having stops or projections to operate the springs, depending side walls overhanging and embracing the side wings of the bottom plate, and followers or washers at the ends of the springs, substantially as specified.

7. In a side bearing, the combination with a bottom plate having side wings furnished each with a slot to receive a removable guide, of a reciprocating top plate having integral guides, removable guides fitting in the slots of the side wings of the bottom plate, and a pair of rockers interposed between the top and bottom plates, substantially as specified.

8. In a side bearing, the combination with a bottom plate having side wings furnished each with a slot to receive a removable guide, of a reciprocating top plate having integral guides, removable guides fitting in the slots of the side wings of the bottom plate, a pair of rockers interposed between the top and bottom plates, the side wings of the bottom plate having each a channel to receive a spring and having stops for the springs to bear against, and the reciprocating top plate being provided with stops or projections to bear against the springs, substantially as specified.

9. In a side bearing, the combination with a bottom plate having side wings furnished each with a slot to receive a removable guide, of a reciprocating top plate having integral guides, removable guides fitting in the slots of the side wings of the bottom plate, a pair of rockers interposed between the top and bottom plates, the side wings of the bottom plate having each a channel to receive a spring and having stops for the springs to bear against the springs, and followers or washers at the ends of the springs, substantially as specified.

FREDERICK B. TOWNSEND.

Witnesses:
EDMUND ADCOCK,
H. M. MUNDAY.